(12) United States Patent
Nunome

(10) Patent No.: US 8,590,131 B2
(45) Date of Patent: Nov. 26, 2013

(54) METHOD OF ATTACHING AND DETACHING PREFORM AND METHOD OF MANUFACTURING OPTICAL FIBER

(75) Inventor: Tomohiro Nunome, Sakura (JP)

(73) Assignee: Fujikura Ltd., Tokyo (JP)

( * ) Notice: Subject to any disclaimer, the term of this patent is extended or adjusted under 35 U.S.C. 154(b) by 365 days.

(21) Appl. No.: 13/041,941

(22) Filed: Mar. 7, 2011

(65) Prior Publication Data

US 2011/0214271 A1 Sep. 8, 2011

(30) Foreign Application Priority Data

Mar. 8, 2010 (JP) ................................. 2010-050779

(51) Int. Cl.
*B23P 19/00* (2006.01)
(52) U.S. Cl.
USPC ...................................................... 29/426.5
(58) Field of Classification Search
USPC ............ 29/426.1, 426.5, 428, 721, 759, 782, 29/235, 240, 281.1; 428/392, 542.8; 65/421, 435, 397
See application file for complete search history.

(56) References Cited

U.S. PATENT DOCUMENTS

| | | |
|---|---|---|
| 4,549,891 A | 10/1985 | Plummer |
| 2007/0044516 A1 | 3/2007 | Taru et al. |
| 2008/0276651 A1 | 11/2008 | Barish et al. |
| 2010/0139323 A1* | 6/2010 | Nunome ......................... 65/435 |
| 2012/0321891 A1* | 12/2012 | Nunome ....................... 428/392 |

FOREIGN PATENT DOCUMENTS

| | | |
|---|---|---|
| CN | 1663922 A | 9/2005 |
| JP | 11-322357 A | 11/1999 |
| JP | 2004-115289 A | 4/2004 |

OTHER PUBLICATIONS

Office Action issued by the Chinese Patent Office in Chinese Application No. 201110057822.X dated May 6, 2013.

* cited by examiner

*Primary Examiner* — John C Hong

(74) *Attorney, Agent, or Firm* — Sughrue Mion, PLLC

(57) ABSTRACT

A method of attaching and detaching a preform to and from a support body, the preform being used to manufacture an optical fiber, the method including: inserting a connection pin through a penetration hole provided in the preform and a penetration hole provided in the support body; attaching the preform to the support body by hanging the preform on the connection pin inserted through the penetration holes; and detaching the preform from the support body by taking out the connection pin from the penetration holes after the connection pin is rotated about an insertion axis due to an action of a moment based on gravity when the hung state of the preform hung on the connection pin is released.

9 Claims, 8 Drawing Sheets

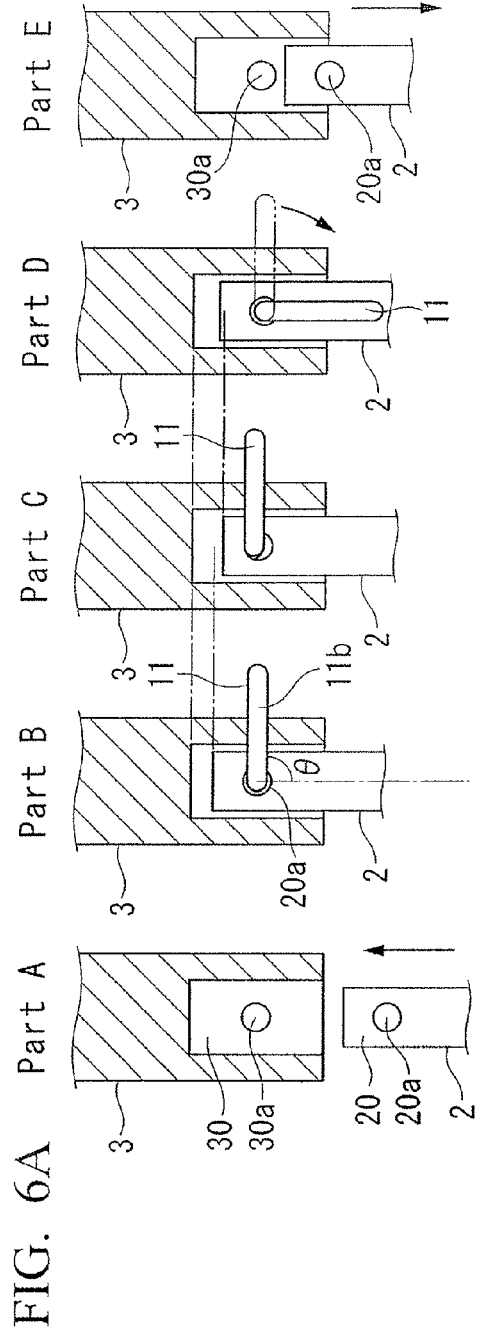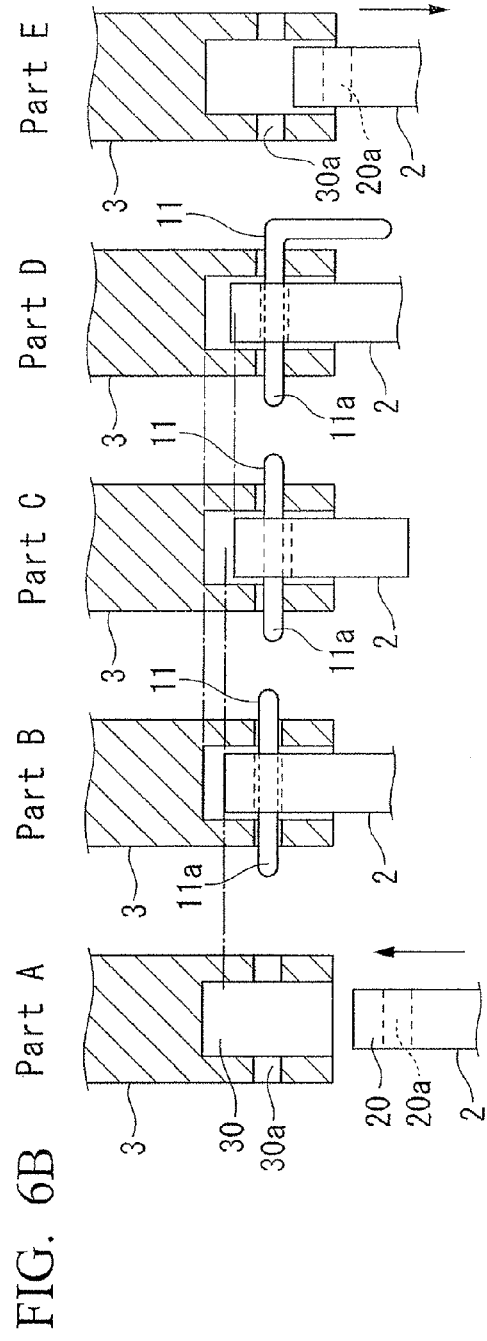
FIG. 6A
FIG. 6B

METHOD OF ATTACHING AND DETACHING PREFORM AND METHOD OF MANUFACTURING OPTICAL FIBER

BACKGROUND OF THE INVENTION

1. Field of the Invention

The present invention relates to a method of attaching and detaching a preform used to manufacture an optical fiber to and from a support body, and a method of manufacturing an optical fiber using the attaching and detaching method.

Priority is claimed on Japanese Patent Application No. 2010-050779, filed on Mar. 8, 2010, the contents of which are incorporated herein by reference.

2. Description of the Related Art

Plural steps need to be sequentially performed in order to manufacture an optical fiber. Specifically, the manufacturing method includes the steps of (a) manufacturing a silica porous preform by depositing silica glass particles on a target through vapor-phase axial deposition method or outside vapor-phase deposition method, (b) manufacturing a transparent optical fiber preform by performing dehydrating and sintering on the silica porous preform in a sintering furnace, (c) processing a front end portion of the optical fiber preform, (d) measuring a refractive index distribution of the optical fiber preform through a preform analyzer, (e) manufacturing an optical fiber by drawing the optical fiber preform, and the like. In these steps, respective preforms such as the target, the silica porous preform, and the optical fiber preform need to be supported while being hung on a fixed rod-shaped support body.

As a method of attaching and detaching a preform to and from a support body when the preform is supported by the support body, Japanese Unexamined Patent Application, First Publication No. H 11-322357 and Japanese Unexamined Patent Application, First Publication No. 2004-115289 disclose a technique in which penetration holes are respectively provided in an upper end portion of the preform and the support body, and a connection pin is inserted through the penetration holes to connect the preform and the support body to each other. Referring to FIG. 11, the above-described connection method will be described in detail.

First, as shown in Part A of FIG. 11, a preform 2 is moved upward by using a gripper device (not shown), so that an upper end portion 20 is fitted to a concave portion 30 provided in a lower end portion of a support body 3. The upper end portion 20 of the preform 2 is provided with a first penetration hole 20a. The concave portion 30 of the support body 3 is provided with a second penetration hole 30a. At the time of the fitting, the positions of the preform 2 and the support body 3 are aligned with each other so that the penetration holes communicate with each other. Further, in FIG. 11, only the cross-section of the support body 3 is shown.

Subsequently, as shown in Part B of FIG. 11, the rod-shaped connection pin 9 is inserted through the first penetration hole 20a and the second penetration hole 30a. Further, as shown in Part C of FIG. 11, the preform 2 is slightly moved downward by using the gripper device, so that the preform 2 is supported while being hung on the connection pin 9. In general, the connection pin 9 is formed of silica glass.

Subsequently, after a desired process is performed on the preform 2, and as shown in Part D of FIG. 11, the preform 2 is slightly moved upward by using the gripper device. Accordingly, the state in which the preform 2 is hung on the connection pin 9 is released while a downward force is not applied from the preform 2 to the connection pin 9.

Subsequently, as shown in Part E of FIG. 11, the connection pin 9 is taken out from the first penetration hole 20a and the second penetration hole 30a, so that the preform 2 is detached from the support body 3.

Since the known attaching and detaching method is not only simple, but also has a benefit that the preform and the connection pin to be used may be easily processed, the attaching and detaching method is widely used in various manufacturing processes for optical fibers.

In general, the inner diameters of the first penetration hole 20a and the second penetration hole 30a are both set to a size slightly larger than the outer diameter of the connection pin 9. The reason is as follows. When the inner diameter is much larger than the outer diameter of the connection pin 9, a positional deviation may easily occur between the preform 2 and the support body 3 when the preform 2 is supported, and the preform 2 and the support body 3 may be easily damaged due to a decrease in the rigidity thereof. Therefore, when the preform 2 is moved upward as shown in Part D of FIG. 11, the positions of the first penetration hole 20a and the second penetration hole 30a need to be precisely aligned with each other so as to allow taking out of the connection pin 9 from the penetration holes. This is because the connection pin 9 is damaged so that it cannot be used any more when the preform 2 is excessively moved upward. Further, in the worst case, the connection pin 9 is bent, so that the preform is dropped. In order to improve the rigidity of the connection pin 9, there is a proposal to use a connection pin that is foamed of ceramics such as silicon nitride or alumina or metal such as platinum. However, when the connection pin formed of ceramics is used, there is a possibility that impurities are mixed in the preform. Further, in the step of performing dehydrating and sintering on the silica porous preform, the connection pin is exposed to a high-temperature chlorine gas, so that the connection pin is corroded. However, when the connection pin formed of metal is used, the connection pin formed of metal such as platinum which is difficult to be corroded is expensive. For this reason, this is not practical. Therefore, as the connection pin, there is no choice but to use the connection pin formed of silica glass.

For this reason, in the past, such steps in Part D and Part E of FIG. 11 need to be carefully performed on the basis of a worker's experience, where the steps are performed to move the preform 2 upward and to take out the preform. For example, when it is difficult to take out the connection pin 9, the preform 2 may be still hung on the connection pin 9 or foreign material such as fine glass particles may be interposed between the connection pin 9 and the first penetration hole 20a or the second penetration hole 30a although the state in which the preform 2 is hung on the connection pin 9 has been released. Likewise, it is difficult to judge why the connection pin is not able to be taken out from the penetration holes. In this case, it is necessary to repetitively move the preform 2 upward and downward or to attempt to take out the connection pin 9 by a stronger force. The same applies to the case where such operations are automatically performed. Further, in this case, the size of the facility becomes larger. However, even when such operations are performed, eventually damage to the connection pin may no longer be prevented. Likewise, there is a problem in that the damage to the connection pin or the preform may not be completely prevented. Further, the working efficiency is low. Since there are such risks, a problem arises in that a large preform is difficult to be handled.

The invention is made in view of such circumstances, and provides a method capable of simply attaching and detaching a preform to and from a support body without damaging various materials or members in use and also capable of attaching and detaching a large preform.

SUMMARY OF THE INVENTION

According to an aspect of the present invention, there is provided a method of attaching and detaching a preform to and from a support body, the preform being used to manufacture an optical fiber, the method including: inserting a connection pin through a penetration hole provided in the preform and a penetration hole provided in the support body; attaching the preform to the support body by hanging the preform on the connection pin inserted through the penetration holes; and detaching the preform from the support body by taking out the connection pin from the penetration holes after the connection pin is rotated about the insertion axis due to an action of a moment based on gravity when the state in which the preform is hung on the connection pin is released.

At least one of the preform and the support body may be movable in a vertical direction. A vertical position of the preform relative to the support body may be adjustable. When the connection pin is inserted through the penetration holes, the preform may be moved upward relative to the support body so that a position of the penetration hole provided in the preform is aligned with a position of the penetration hole provided in the support body, and the connection pin is inserted through the penetration holes. When the preform is attached to the support body, the preform may be moved downward relative to the support body so that the preform is hung on the connection pin. When the preform is detached from the support body, the preform may be moved upward relative to the connection pin so that the state in which the preform is hung on the connection pin is released.

The connection pin may include an insertion portion which is inserted through the penetration hole of the preform and the penetration hole of the support body, and a non-insertion portion which forms a predetermined angle with respect to the insertion portion. When the preform is attached to the support body, the connection pin may be disposed in the penetration holes so that an angle formed between a central axis of the non-insertion portion and a direction of gravity is neither 0° nor 180°.

The moment may be greater than or equal to $1 \times 10^{-2}$ (N·cm).

The connection pin may be formed of silica glass.

The connection pin may be colorless and transparent or a part of the connection pin may be white.

The support body may include a connection component that is attachable to the support body or detachable from the support body, and the connection component may be connected to the preform.

According to another aspect of the present invention, there is provided a method of manufacturing an optical fiber, the method including: attaching and detaching a preform to and from a support body through the above-described attaching and detaching method.

The attaching and detaching may be included in one or more steps selected from a group including manufacturing a silica porous preform by depositing silica glass particles on a target, manufacturing an optical fiber preform by performing sintering or dehydrating and sintering on the silica porous preform, sharpening a front end of the optical fiber preform, and manufacturing an optical fiber by drawing the optical fiber preform.

According to the present invention, the preform can be simply attached to and detached from the support body without damaging various materials or members in use, and the attaching and detaching method can be also used in order to attach or detach a large preform.

BRIEF DESCRIPTION OF THE DRAWINGS

FIG. 6A is a front view illustrating an attaching and detaching method according to an embodiment of the present invention and is a diagram partially illustrating a cross-section of a support body.

FIG. 6B is a side view illustrating the attaching and detaching method according to the embodiment of the present invention, and is a diagram partially illustrating the cross-section of the support body.

DETAILED DESCRIPTION OF THE INVENTION

<Method of Attaching and Detaching Preform>

A method of attaching and detaching a preform according to an embodiment of the present invention is a method of attaching and detaching a preform to and from a support body, where the support body supports the preform used to manufacture an optical fiber by hanging the preform on the support body, and an upper end portion of the preform and the support body are respectively provided with penetration holes allowing a connection pin to be inserted therethrough. In the preform attachment step of attaching the preform to the support body in a manner such that the connection pin is inserted through the penetration holes of the preform and the support body and the preform is hung on the connection pin, the connection pin is disposed to be rotatable about the insertion axis due to an action of a moment based on gravity when the state in which the preform is hung thereon is released. In the preform detachment step of detaching the preform from the support body, the connection pin is taken out from the penetration hole after the rotation of the connection pin.

In the attaching and detaching method of the embodiment, since the shape of the connection pin and the inserted disposition thereof are adjusted so that the connection pin is rotated about the insertion axis due to an action of the moment based on gravity when a downward force except for gravity is not applied to the connection pin, an excellent effect is exhibited.

In the embodiment, the preform indicates a general material that is used to manufacture an optical fiber. Specifically, examples of the preform include an optical fiber preform which is used as an optical fiber through drawing, a silica porous preform which is used as an optical fiber preform through sintering or dehydrating and sintering, a target which is used as a silica porous preform by depositing silica glass particles thereon, and the like.

In general, the preform includes a dummy portion which is formed at the end portion of the preform to serve as a portion supported by the support body and is not provided to be manufactured as the optical fiber. The dummy portion is formed by connecting a dummy member to a preform body using, for example, a method such as heat melting. Further, the end portion of the preform may be used as the dummy portion without connecting the dummy member to the preform body. In the embodiment, the preform indicates a material which has the dummy portion at the end portion thereof. Then, as described below, the dummy portion is provided with a penetration hole which is used for connection to the support body.

Hereinafter, the embodiment will be described by referring to the accompanying drawings.

Figure 1:
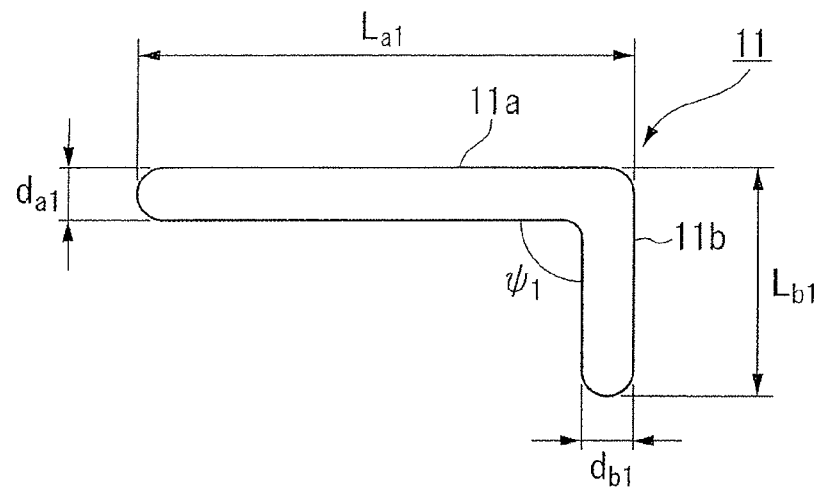
FIG. 1 is a front view illustrating a connection pin used in an embodiment of the present invention.

FIG. 1 is a front view illustrating an example of a connection pin that is used in the embodiment.

A connection pin 11 is formed in a substantially L-shape, and an angle $\psi_1$ formed between the long shaft portion 11a and the short shaft portion 11b is 90°. Since all of the long shaft portion 11a and the short shaft portion 11b of the connection pin 11 may be used as an insertion portion which is inserted through a penetration hole, the versatility of the connection pin 11 is high. Further, the connection pin 11 may be easily manufactured.

The material of the connection pin 11 is not particularly limited, and may be the same as that of the known connection pin. It is desirable that the material of the connection pin 11 is glass, and it is more desirable that the material thereof is silica glass.

It is desirable that the color of the connection pin 11 is colorless and transparent or a part of the connection pin is white. When a part of the connection pin 11 is white, the visibility improves, so that the connection pin 11 may be more easily handled.

Further, when the connection pin 11 is formed as a connection pin which is formed of opaque glass containing a minute amount of bubbles in silica glass, a connection pin which is formed of glass partially or entirely finished by grinding, a connection pin which is partially or entirely coated with fine glass particles, or the like, the heat resistance of the connection pin 11 improves. Further, as described above, since a part of the connection pin 11 is white, the connection pin may be more easily handled.

Further, since the surface of the connection pin 11 is partially or entirely polished by flame, surface roughness (Ra) may be reduced. Accordingly, in the attaching and detaching method of the embodiment to be described later, the connection pin may be more easily rotated.

Furthermore, since annealing (heat treatment) is performed after flame-polishing, stretching, grinding finishing, and the like at the time of manufacturing the connection pin 11, the generation of cracking may be suppressed.

One of a long shaft portion 11a and a short shaft portion 11b is formed as an insertion portion which is inserted through a penetration hole of a preform and a support body, and the other thereof is formed as a portion which generates a moment rotating the connection pin 11 about the insertion axis. It may be arbitrarily selected which of the long shaft portion 11a and the short shaft portion 11b is formed as the insertion portion inserted through the penetration hole. Further, here, an example is shown in which the axial length $L_{a1}$ of the long shaft portion 11a and the axial length $L_{b1}$ of the short shaft portion 11b are different from each other, but the lengths may be equal to each other.

The cross-section of each of the long shaft portion 11a and the short shaft portion 11b perpendicular to the axial direction is formed in a substantially round shape. The diameters (the outer diameter $d_{a1}$ of the long shaft portion 11a and the outer diameter $d_{b1}$ of the short shaft portion 11b) of the long shaft portion 11a and the short shaft portion 11b are set to be uniform except for the front end portions thereof. All of the front end portions of the long shaft portion 11a and the short shaft portion 11b are formed in a curved surface shape or a tapered shape of which the outer diameter gradually decreases. Further, the front end portion of at least one of the long shaft portion 11a and the short shaft portion 11b may be formed to have a uniform outer diameter so that the outer diameter does not change. Since the front end portion serving as the insertion portion to be inserted through the penetration hole is formed so that the outer diameter changes, the connection pin may be more easily inserted through the penetration hole and be more easily extracted from the penetration hole.

In the long shaft portion 11a and the short shaft portion 11b, the length ($L_{a1}$ or $L_{b1}$) of the portion serving as the insertion portion to be inserted through the penetration hole may be set to be greater than or equal to the insertion length except for the outer diameter of the portion not serving as the insertion portion. In general, the "insertion length" indicates the longer one of the penetration holes of the preform and the support body to be used. In general, for example, regarding the preform of about 40 to 50 kg, it is desirable that the length of the insertion portion is from 10 to 15 cm in consideration of the support body 3 to be used.

On the other hand, in the long shaft portion 11a and the short shaft portion 11b, the length of the portion (non-insertion portion) not serving as the insertion portion inserted through the penetration hole may be set to a length in which sufficient moment for rotating the connection pin 11 is generated. Therefore, the length of the non-insertion portion may be appropriately set in consideration of the shape or the like thereof. For example, in the case of the non-insertion portion having a rod shape of which the cross-sectional shape is substantially uniform, it is desirable that the length of the non-insertion portion is greater than or equal to 1 cm with respect to the preform of about 40 to 50 kg. The upper limit of the length of the non-insertion portion is not particularly limited, but it is desirable that the length is about 12 cm in consideration of the handling state of the connection pin.

The sizes of the outer diameter $d_{a1}$ of the long shaft portion 11$a$ and the outer diameter $d_{b1}$ of the short shaft portion 11$b$ may be appropriately adjusted in accordance with the size of the preform 2 or the support body 3. For example, regarding the preform of about 40 to 50 kg, it is desirable that the sizes of the outer diameter $d_{a1}$ of the long shaft portion 11$a$ and the outer diameter $d_{b1}$ of the short shaft portion 11$b$ are from 1 to 5 cm.

The moment acting on the connection pin 11 will be described by referring to FIG. 2.

Figure 2:
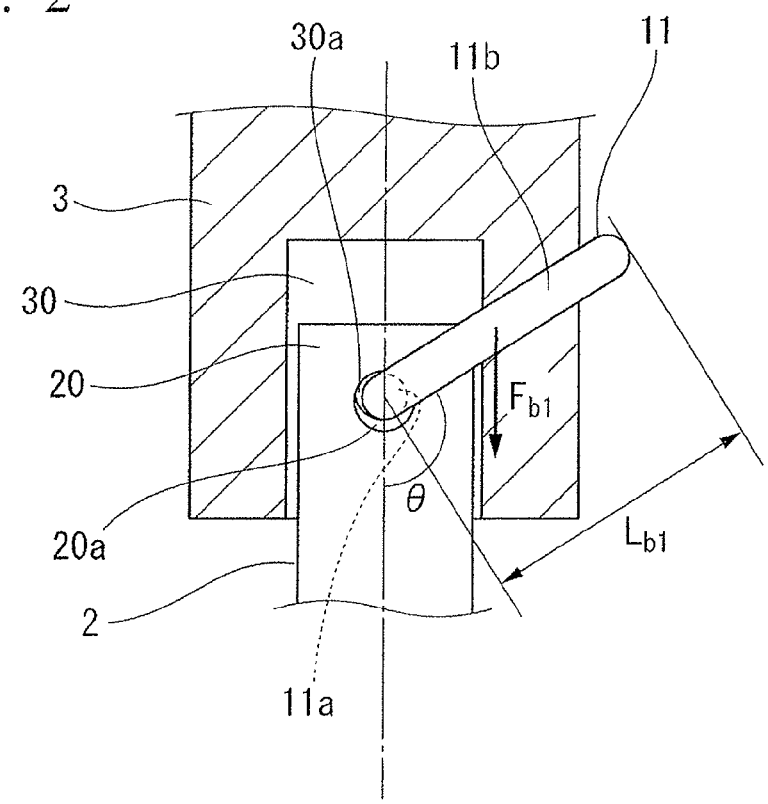
FIG. 2 is a front view illustrating an example of a state in which the connection pin of FIG. 1 is inserted through penetration holes of a preform and a support body.
Figure 11:
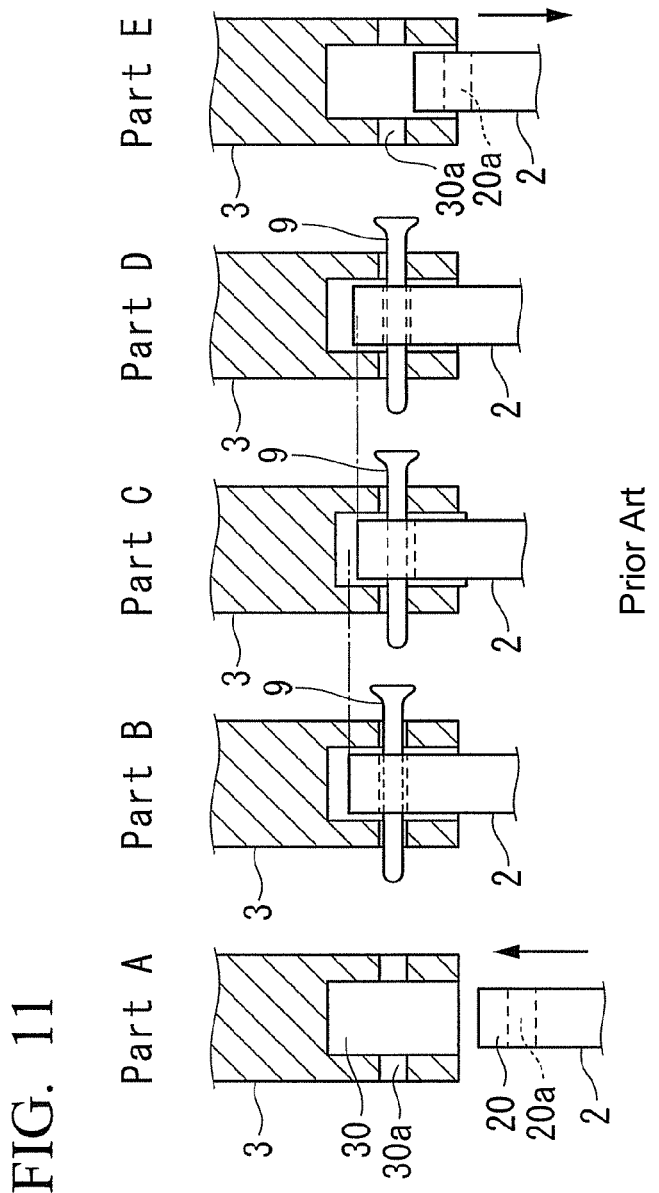
FIG. 11 is a side view illustrating a known support method of connecting the preform and the support body to each other by the connection pin.

FIG. 2 is a front view illustrating an example of a state in which the connection pin 11 is inserted through the penetration hole. However, only the cross-section of the support body is shown in the drawing. A case will be described when the preform 2 and the support body 3 of FIG. 11 are used. That is, an upper end portion 20 of the preform 2 is provided with a first penetration hole 20$a$. A concave portion 30 of the support body 3 is provided with a second penetration hole 30$a$. The penetration holes are both formed in a substantially linear shape, and the cross-sectional shape perpendicular to the axis is a substantially round shape. With such a shape, the insertion operation and the extraction operation of the connection pin 11 may be more easily performed.

The upper end portion 20 of the preform 2 is fitted to the concave portion 30 provided at the lower end portion of the support body 3. The long shaft portion 11$a$ of the connection pin 11 is inserted through the first penetration hole 20$a$ and the second penetration hole 30$a$. The moment acting on the short shaft portion 11$b$ of the connection pin 11 will be described.

The angle formed between the length direction of the short shaft portion 11$b$ and the vertical direction (here, the axial direction of the preform) is denoted by $\theta$. Gravity acting on the axial center portion of the short shaft portion 11$b$ is denoted by $F_{b1}$ (N). The moment M (N·cm) acting on the connection pin 11 is obtained as the moment $M_b$ (N·cm) acting on the short shaft portion 11$b$ shown in the following equation (1).

$$M_b = F_{b1} \times L_{b1} \cos \theta / 2 \qquad (1)$$

Further, in the moment M based on the arrangement of FIG. 2, the influence of the long shaft portion 11$a$ serving as the insertion portion inserted through the penetration hole in the connection pin 11 is disregarded. The reason is because the influence on the moment is extremely small when the size of the connection pin 11 used in the embodiment is considered. An example of the influence given from the insertion portion of the connection pin to the moment may include the moment based on the friction between the connection pin and the penetration hole.

Figure 3:
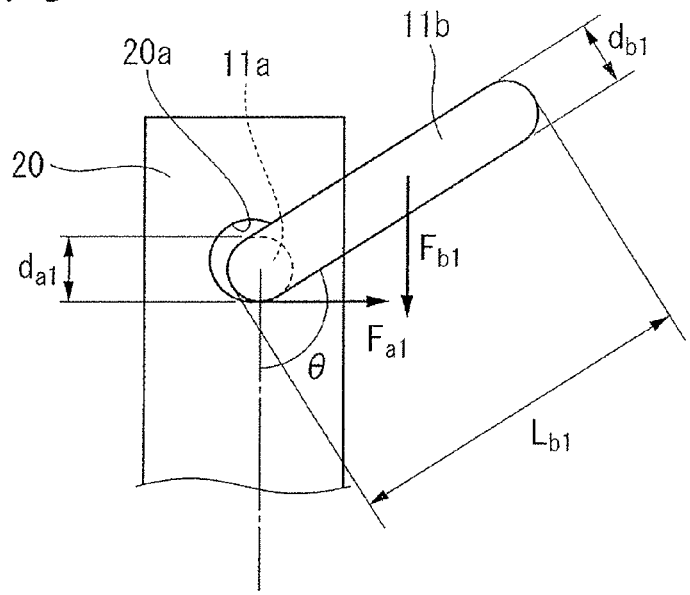
FIG. 3 is a front view illustrating a state in which the connection pin of FIG. 1 is inserted through the penetration holes of the preform and the support body.

Here, the moment M (N·cm) acting on the connection pin 11 when the mass of the long shaft portion 11$a$ is denoted by W (kg) will be described by referring to FIG. 3. The friction force acting on the long shaft portion 11$a$ is denoted by $F_{a1}$ (N). The friction coefficient between the long shaft portion 11$a$ and the first and second penetration holes 20$a$ and 30$a$ is denoted by $\mu$. The moment $M_a$ (N·cm) based on the friction force is obtained as the following equation (2) when the direction of $M_b$ is set as the positive direction.

$$M_a = -F_{a1} \times d_{a1}/2 = \mu \times 9.8 W \times d_{a1}/2 \qquad (2)$$

In general, the static friction coefficient between glass surfaces is known to be about 0.94. However, when this value is applied to the equation (2) above, $F_{a1}$ becomes a very large value, and hence the connection pin 11 hardly rotates by calculation. For this reason, the calculation does not match the actual state. It is supposed that this calculation does not reflect that the friction coefficient is strongly affected by the surface state or the shape of the object as the target. According to the careful examination through examples to be described later, the inventor and the like have found that the calculation result exactly matching the actual state was obtained when $\mu$ was set to about 0.01 in the equation (2) above.

From the above-described viewpoint, generally the connection pin 11 may be sufficiently selected in consideration of the moment $M_b$ shown in the equation (1) above without considering the moment $M_a$. Then, for example, when the outer diameter $d_{a1}$ of the long shaft portion 11$a$ is much larger than the outer diameter $d_{b1}$ of the short shaft portion 11$b$, the influence of the moment $M_a$ may not be disregarded. In this case, the connection pin 11 may be selected by setting the moment M (N·cm) acting on the connection pin 11 as $M_b + M_a$.

In FIG. 1, a case has been described in which the connection pin is formed in a substantially L-shape such that the long shaft portion 11$a$ and the short shaft portion 11$b$ including or excluding the front end portion are formed in a substantially cylindrical rod shape, but the present invention is not limited thereto. For example, in the long shaft portion 11$a$ and the short shaft portion 11$b$, a non-insertion portion may have a shape of which the outer diameter increases toward the front end portion. With such a shape, the moment acting on the connection pin may be set to be larger, and hence the excellent effect of the present invention is obtained.

FIGS. 4A to 4D are front views illustrating an example of the connection pin in which the long shaft portion is used as the insertion portion in the connection pin having such a shape.

Figure 4A:
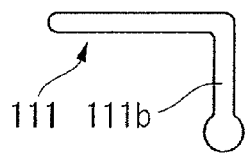
FIG. 4A is a front view illustrating a modified example of the connection pin that is used in an embodiment of the present invention.

A connection pin 111 of FIG. 4A is formed such that a portion excluding the front end portion is formed in a substantially cylindrical shape, and includes a short shaft portion 111$b$ having a front end portion provided with a substantially spherical portion having a larger outer diameter than that of the substantially cylindrical portion.

Figure 4B:
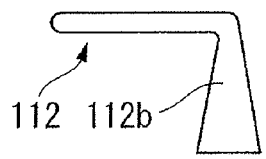
FIG. 4B is a front view illustrating a modified example of the connection pin that is used in an embodiment of the present invention.

A connection pin 112 of FIG. 4B includes a short shaft portion 112$b$ which is formed in a conical shape such that the outer diameter thereof increases toward the front end portion.

Figure 4C:
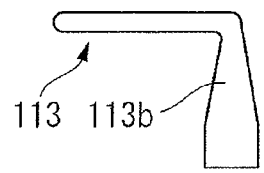
FIG. 4C is a front view illustrating a modified example of the connection pin that is used in an embodiment of the present invention.

A connection pin 113 of FIG. 4C includes a short shaft portion 113$b$ which has a curved side surface such that the outer diameter increases toward the front end portion and the rate of increase gradually decreases toward the front end portion.

Figure 4D:
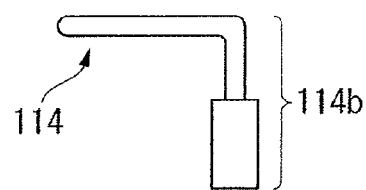
FIG. 4D is a front view illustrating a modified example of the connection pin that is used in an embodiment of the present invention.

A connection pin 114 of FIG. 4D includes a short shaft portion 114$b$ which has two types of substantially cylindrical portions having different outer diameters and in which the portion having the larger outer diameter forms the front end portion.

Further, the connection pins shown in FIGS. 4A to 4D are examples of the connection pin appropriate for the present invention, but the present invention is not limited to the connection pins having such shapes. For example, in FIG. 4A, the shape of the front end portion of the short shaft portion may be a substantially cylindrical shape, a substantially conical shape, a substantially rectangular columnar shape, a substantially rectangular conical shape, and the like instead of the substantially spherical shape. In FIG. 4B, the shape of the short shaft portion may be a substantially rectangular conical shape instead of the substantially conical shape. In FIG. 4C, the rate of increase of the outer diameter may gradually increase toward the front end portion. In FIG. 4D, the shape of the short shaft portion may be a substantially conical shape, a substantially rectangular columnar shape, a substantially rectangular conical shape, and the like instead of the substantially cylindrical shape. Then, instead of the connection pins of FIGS. 4A to 4D, the connection pin may be formed by the combination of plural shapes.

In the long shaft portion 11a and the short shaft portion 11b, the insertion portion may be also formed in any shape other than the substantially cylindrical shape. As a desirable shape, a shape may be exemplified in which the outer diameter in the cross-section perpendicular to the axial direction is uniform. More specifically, a substantially rectangular columnar shape may be exemplified.

In the long shaft portion 11a and the short shaft portion 11b, when the portion including or excluding the front end portion is formed in a shape other than the substantially cylindrical shape, it is desirable that the maximum value of the diameter in the cross-section perpendicular to the axial direction is equal to $d_{a1}$ or $d_{b1}$.

In the long shaft portion 11a and the short shaft portion 11b, the shapes of the cross-sections perpendicular to the axial direction may be the same as each other or different from each other. Then, the diameters of the long shaft portion 11a and the short shaft portion 11b may be equal to each other or different from each other.

Here, an example is shown in which $\psi_1$ is 90°, however, the angle may be other than 90°.

However, when $L_{a1}$ and $L_{b1}$ are set to be uniform, the moment acting on the connection pin 11 becomes maximal when the angle is 90°.

Figure 5A:
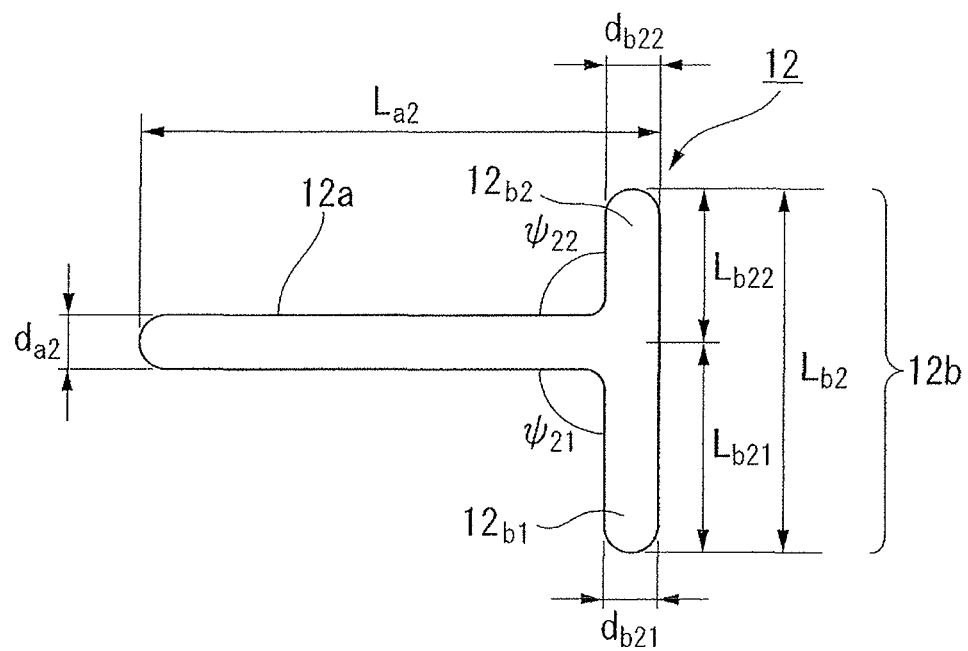
FIG. 5A is a front view illustrating a modified example of the connection pin that is used in an embodiment of the present invention.
Figure 5B:
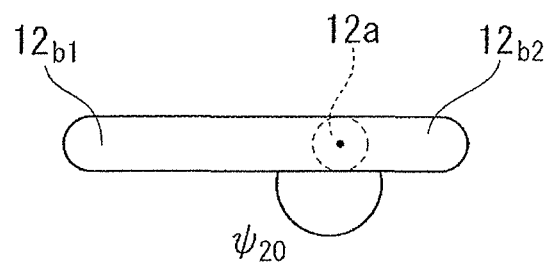
FIG. 5B is a side view illustrating a modified example of the connection pin that is used in an embodiment of the present invention.

FIG. 5A is a front view illustrating a modified example of the connection pin used in the embodiment. FIG. 5B is a side view illustrating a modified example of the connection pin used in the embodiment.

A connection pin 12 may have a substantially T-shape. That is, the connection pin 12 is different from the connection pin 11 in that the connection portion between the long shaft portion and the short shaft portion is located at the axial center portion of the short shaft portion. The connection pin 12 is better than the connection pin 11 in that the connection pin 12 may be easily gripped and handled by hand.

The connection pin 12 includes a long shaft portion 12a and a short shaft portion 12b. The short shaft portion 12b includes a first short shaft portion $12b_1$ and a second short shaft portion $12b_2$ from the boundary which is the connection portion to the long shaft portion 12a.

An angle $\psi_{21}$ formed between the long shaft portion 12a and the first short shaft portion $12b_1$ and an angle $\psi_{22}$ formed between the long shaft portion 12a and the second short shaft portion $12b_2$ are both 90°. Further, an angle $\psi_{20}$ formed between the first short shaft portion $12b_1$ and the second short shaft portion $12b_2$ is 180°. An outer diameter $d_{a2}$ of the long shaft portion 12a, an outer diameter $d_{b21}$ of the first short shaft portion $12b_1$, and an outer diameter $d_{b22}$ of the second short shaft portion $12b_2$ are all set to be uniform except for the front end portions thereof. However, in the embodiment, at least one of the outer diameters may be different from the other two.

In the connection pin 12, the long shaft portion 12a is used as the insertion portion which is inserted through the penetration hole, and the short shaft portion 12b is used as a portion generating a moment.

Here, an example is shown in which an axial length $L_{a2}$ of the long shaft portion 12a is different from an axial length $L_{b2}$ (that is, the sum of an axial length $L_{b21}$ of the first short shaft portion $12b_1$ and an axial length $L_{b22}$ of the second short shaft portion $12b_2$) of the short shaft portion 12b, but they may be equal to each other.

Further, here, an example is shown in which the angle $\psi_{20}$ formed between the first short shaft portion $12b_1$ and the second short shaft portion $12b_2$ is 180°, but the angle may be smaller or larger than 180°. That is, the angle may be arbitrarily set. However, in the embodiment, since sufficient effect of the present invention is obtained in that the connection pin is easily manufactured, it is desirable that the angle $\psi_{20}$ is 180°.

Furthermore, here, an example is shown in which $\psi_{21}$ and $\psi_{22}$ are both 90°, however, the angles $\psi_{21}$ and $\psi_{22}$ may be different from each other, or smaller or larger than 90°. However, when the sizes of $L_{b21}$ and $L_{b22}$ are fixed, the moment acting on the connection pin 11 becomes maximal when $\psi_{21}$ and $\psi_{22}$ are both 90°. Then, the connection pin 12 may be easily manufactured.

The connection pin 12 has the same configuration as that of the connection pin 11 except for the above-described point. Therefore, for example, at least one of the first short shaft portion $12b_1$ and the second short shaft portion $12b_2$ may have a portion with a shape (which is one of the shapes shown in FIGS. 4A to 4D) increasing in the outer diameter toward the front end portion as in the short shaft portion 11b of the connection pin 11.

Regarding the moment acting on the connection pin 12, two moments acting on the first short shaft portion $12b_1$ and the second short shaft portion $12b_2$ may be added to each other as in the case of the connection pin 11. That is, in FIG. 2, the connection pin 12 is used instead of the connection pin 11, and the connection pin 12 is inserted through the first penetration hole 20a and the second penetration hole 30a so that the first short shaft portion $12b_1$ is located above the second short shaft portion $12b_2$. The angle formed between the length direction of the first short shaft portion $12b_1$ and the vertical direction (here, the axial direction of the preform) is denoted by θ. Gravity acting on the axial center portion of the first short shaft portion $12b_1$ is denoted by $F_{b1}$ (N). Gravity acting on the axial center portion of the second short shaft portion $12b_2$ is denoted by $F_{b2}$ (N). The first moment $M_{b1}$ (N·cm) acting on the first short shaft portion $12b_1$ is obtained by the following equation (3). Further, when the direction of $M_{b1}$ is set as the positive direction, the second moment $M_{b2}$ (N·cm) acting on the second short shaft portion $12b_2$ is obtained as the following equation (4). Then, the moment M (N·cm) acting on the connection pin 12 is the moment $M_b$ (N·cm) acting on the short shaft portion 11b and shown in the following equation (5). Further, as necessary, the moment of the long shaft portion 12a may be also taken into consideration.

$$M_{b1}=F_{b1}\times L_{b21} \cos \theta/2 \qquad (3)$$

$$M_{b2}=-F_{b2}\times L_{b22} \cos \theta/2 \qquad (4)$$

$$M_b=M_{b1}+M_{b2} \qquad (5)$$

The rotation generated by the moment of the connection pin is influenced by the surface state or the like of the connection pin. However, in the embodiment, as described in the examples below, when the moment is set to be greater than or equal to $1\times10^{-2}$ (N·cm), the connection pin may be smoothly rotated regardless of the surface state. Further, the upper limit of the moment is not particularly limited, but it is desirable that the upper limit is less than or equal to 2.5 (N·cm) from the practical viewpoint. With such a configuration, sufficient effect of the present invention is obtained without generating excessive moment.

Next, the attaching and detaching method of the embodiment will be described by referring to FIGS. 6A and 6B. FIG.

6A is a front view when seen from the direction in which the connection pin is inserted through the penetration hole (however, only the cross-section of the support body is shown). FIG. 6B is a side view when seen from the direction perpendicular to the direction in which the connection pin is inserted through the penetration hole (however, only the cross-section of the support body is shown). Further, the connection pin and the support body shown in FIGS. 6A and 6B are both the same as the connection pin and the support body shown in FIG. 2. The attaching and detaching method of the embodiment has characteristic steps of attaching the preform to the support body and of detaching the preform from the support body.

(Step of Attaching Preform)

First, as shown in Part A of FIG. 6A, the gripped preform 2 is moved upward relative to the gripped and positioned support body 3, so that the upper end portion 20 is fitted to the concave portion 30 provided in the lower end portion of the support body 3. Then, the penetration holes are aligned with each other so that the first penetration hole 20a and the second penetration hole 30a communicate with each other. At this time, it is desirable that the positioning operation is performed so that the central axes of the first penetration hole 20a and the second penetration hole 30a are aligned with each other. Further, the unit gripping the preform 2 and the support body 3 may be formed as a known unit. For example, the unit gripping the preform 2 may be formed as a unit supporting the lower side of the preform 2. When a flange portion is provided in the preform 2, a unit may be exemplified which supports the flange portion.

Subsequently, as shown in Part B of FIG. 6A, the connection pin 11 is inserted through the first penetration hole 20a and the second penetration hole 30a. Here, the long shaft portion 11a is used as the insertion portion. At this time, the connection pin 11 is disposed so that the angle formed between the length direction of the short shaft portion 11b and the vertical direction (here, the axial direction of the preform 2) becomes an angle θ other than 0° and 180°. With such a configuration, the connection pin 11 is rotatable about the insertion axis (the central axis of the long shaft portion 11a) due to an action of a moment based on gravity while a downward force other than gravity is not applied to the long shaft portion 11a.

It is desirable that the angle θ is from 70 to 110°, and particularly desirable that the angle θ is 90°. With such a configuration, the moment acting on the short shaft portion 11b may be set to be large, and the rotation state of the connection pin may be easily recognized, whereby the further excellent effect of the present invention is obtained. In the Part B of FIG. 6A, the angle θ is 90°.

Subsequently, as shown in Part C of FIG. 6A, the preform 2 is slightly moved downward, so that the preform 2 is hung on the connection pin 11 to support the preform 2 while the above-described disposition of the connection pin 11 is maintained. At this time, since a downward force other than gravity is applied to the long shaft portion 11a due to the preform 2, the long shaft portion 11a is sandwiched between the inner surface of the first penetration hole 20a and the inner surface of the second penetration hole 30a. For this reason, the above-described disposition is maintained when the long shaft portion 11a is inserted.

Consequently, the step of attaching the preform is completed.

(Step of Detaching Preform)

Subsequently, after a desired process is performed on the preform 2, as shown in Part D of FIG. 6A, the processed preform 2 is slightly moved upward, so that the state in which the preform 2 is hung on the connection pin 11 is released.

With such a configuration, a downward force is not applied from the preform 2 to the long shaft portion 11a. For this reason, the connection pin 11 is rotated about the insertion axis (the central axis of the long shaft portion 11a) due to an action of the moment based on gravity, so that the angle θ becomes almost 0°. Then, since the long shaft portion 11a slightly contacts or does not contact the inner surfaces of the first penetration hole 20a and the second penetration hole 30a, it is easy to take out the connection pin 11.

After the rotation of the connection pin 11 is checked, the upward movement of the preform 2 is immediately stopped, and the upper portion of the long shaft portion 11a contacts the inner surfaces of the first penetration hole 20a and the second penetration hole 30a, whereby a large force is not applied thereto.

Subsequently, as shown in Part E of FIG. 6A, the connection pin 11 is taken out from the first penetration hole 20a and the second penetration hole 30a, so that the preform 2 is detached from the support body 3. At this time, since it is easy to take out the connection pin 11, damage to the connection pin 11, the preform 2, and the support body 3 is suppressed. For example, since the connection pin 11 is not bent, the preform 2 is not dropped.

Consequently, the step of detaching the preform is completed.

Further, here, an example is shown in which the position of the support body 3 is fixed, and the preform 2 is moved upward and downward so as to perform the positioning operation of the penetration holes, an operation of hanging the preform 2 on the connection pin 11, or an operation of eliminating the hanging state, but the present invention is not limited thereto. Instead of this example, a configuration may be adopted in which the vertical position of the preform 2 relative to the support body 3 is adjustable. That is, the preform 2 may be fixed, and the support body 3 may be moved upward and downward. Further, both the preform 2 and the support body 3 may be moved upward and downward. For this reason, at least one of the gripped preform 2 and the support body 3 may be moved upward and downward.

So far, a configuration has been described in which the support body has the concave portion at the lower end portion and the upper end portion of the preform is fitted to the concave portion to be connected to the support body, but the present invention is not limited thereto. Instead of this configuration, any support body may be used as long as the support body may be used to support the preform. For example, a configuration may be exemplified in which a connection component is provided in a body, and the connection component and the preform are connected to each other to support the preform. Here, the connection component serves as a joint.

Figure 7A:
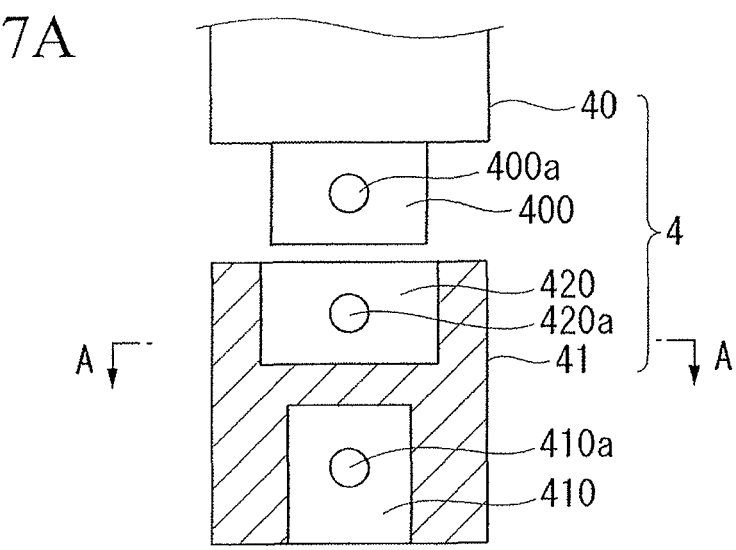
FIG. 7A is a front view illustrating an example of the support body equipped with a connection component used in an embodiment of the present invention.
Figure 7B:
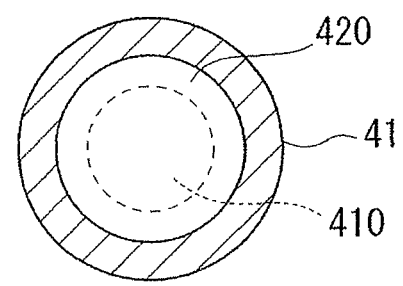
FIG. 7B is a cross-sectional view taken along the line A-A of FIG. 7A.

FIG. 7A is a front view illustrating an example of the support body having the connection component used in the embodiment. FIG. 7B is a cross-sectional view taken along the line A-A of FIG. 7A. However, in FIG. 7A, only the cross-section of the connection component 41 is shown.

A support body 4 includes a body 40 and a connection component 41. The lower end portion of the connection component 41 is provided with a first concave portion 410 to which the upper end portion 20 of the preform 2 is fitted. The upper end portion of the connection component 41 is provided with a second concave portion 420 to which a protruding lower end portion 400 of the body 40 is fitted. The first concave portion 410 is provided with a second penetration hole 410a. The second concave portion 420 is provided with a third penetration hole 420a. The lower end portion 400 of the body 40 is provided with a fourth penetration hole 400a.

The second penetration hole 410a is a penetration hole which is the same as the second penetration hole 30a of the support body 3 described above, and is a penetration hole which is used for connection to the preform 2 through the connection pin. Further, the third penetration hole 420a is also a penetration hole which is the same as the second penetration hole 30a, and is a penetration hole which is used for connection to the body 40 through the connection pin. Then, the fourth penetration hole 400a is also a penetration hole which is the same as the second penetration hole 30a, and is a penetration hole which is used for connection to the connection component 41 through the connection pin.

The first concave portion 410 and the second concave portion 420 may be separately provided as shown in this example, or may be integrally provided so that their bottom portions are perforated to communicate with each other.

Figure 8:
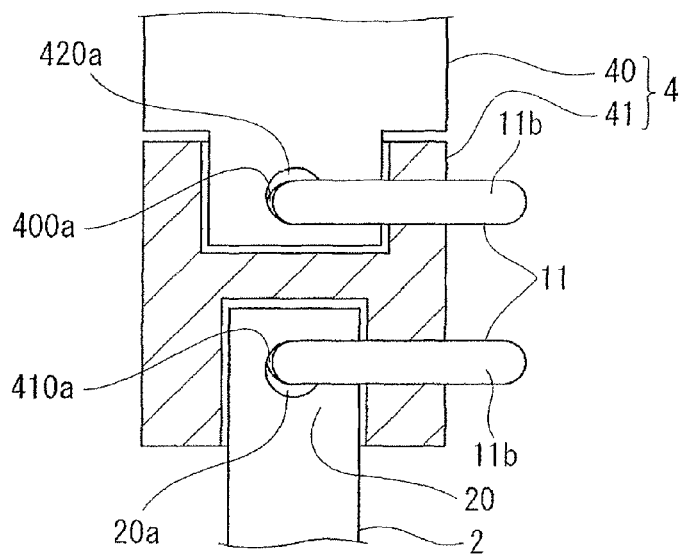
FIG. 8 is a front view illustrating an example of a state in which the connection pin of FIG. 1 is inserted through the penetration holes of the preform and the support body by using the connection component.

Even in the case of using the support body 4, the attaching and detaching method of the embodiment may be used as in the case of using the support body 3. FIG. 8 is a schematic diagram illustrating an example of a state in which the connection pin of FIG. 1 is inserted through the penetration holes of the preform and the support body using the support body 4. However, only the cross-section of the connection component 41 is shown.

That is, the upper end portion 20 of the preform 2 is fitted to the first concave portion 410 of the connection component 41, and the penetration holes are aligned with each other so that the first penetration hole 20a and the second penetration hole 410a communicate with each other. Then, the connection pin 11 is inserted through the penetration hole, and the preform 2 is hung on the connection pin 11 to support the preform 2.

The connection between the body 40 and the connection component 41 in the support body 4 may be performed in the same manner. That is, the lower end portion 400 of the body 40 is fitted to the second concave portion 420 of the connection component 41, and the penetration holes are aligned with each other so that the third penetration hole 420a and the fourth penetration hole 400a communicate with each other. Then, the connection pin 11 is inserted through the penetration holes, and the connection component 41 is hung on the connection pin 11 to support the connection component 41.

Any one of the connection between the preform 2 and the connection component 41 and the connection between the body 40 and the connection component 41 may be performed earlier than the other. In general, it is desirable that the connection between the body 40 and the connection component 41 is performed earlier than the connection between the preform 2 and the connection component 41 in that the connection is more easily performed.

After a desired process is performed on the preform 2, for example, the preform 2 is slightly moved upward, so that a state in which the preform 2 is hung on the connection pin 11 is released, and it is checked whether the connection pin 11 is rotated about the insertion axis. Then, the upward movement of the preform 2 is stopped, and the connection pin 11 is taken out from the first penetration hole 20a and the second penetration hole 410a, so that the preform 2 is detached from the connection component 41.

The detachment of the connection component 41 from the body 40 of the support body 4 may be performed in the same manner. For example, the connection component 41 is slightly moved upward so that the state in which the connection component 41 is hung on the connection pin 11 is released, and it is checked whether the connection pin 11 is rotated about the insertion axis. Then, the upward movement of the connection component 41 is stopped, and the connection pin 11 is taken out from the third penetration hole 420a and the fourth penetration hole 400a, so that the connection component 41 is detached from the body 40.

Any one of the detachment of the preform 2 from the connection component 41 and the detachment of the connection component 41 from the body 40 may be performed earlier than the other. In general, it is desirable that the detachment of the preform 2 from the connection component 41 is performed earlier than the other in that the detachment may be more easily performed.

Further, in the case of using the support body 4 of the embodiment, damage to the preform 2 may be prevented. Further, since the attachment and detachment of the connection component 41 to and from the body 40 may not be performed every time, the connection between the body 40 and the connection component 41 may not be performed by using the connection pin such as the connection pin 11 on which the moment acts. However, it is desirable to use the connection pin 11 or the like in that the damage of the support body 4 may be prevented.

In the embodiment, the easiness of the rotation of the connection pin is mainly dependent on the friction force between the insertion portion of the connection pin and the penetration hole and the magnitude of the moment. For smooth rotation, for example, the surface of the connection pin may be made smooth. Then, it is desirable that the surface roughness (Ra) is less than or equal to 6 μm, and more desirable that the surface roughness is less than or equal to 4.5 μm. Further, even when the moment is small such as to be less than $1.0 \times 10^{-2}$ (N·cm), it is desirable that the surface roughness is less than or equal to 0.3 μm in order to smoothly rotate the connection pin. In order to reduce the surface roughness, a known method such as flame-polishing may be used.

On the other hand, it is desirable that the moment acting on the connection pin is greater than or equal to $1.0 \times 10^{-3}$ (N·cm), and is more desirable that the moment is greater than or equal to $2.5 \times 10^{-3}$ (N·cm). Then, in order to obtain the effect of the present invention without using the surface roughness of the connection pin, it is desirable that the moment is greater than or equal to $8.0 \times 10^{-3}$ (N·cm), and is more desirable that the moment is greater than or equal to $1.0 \times 10^{-2}$ (N·cm).

According to the attaching and detaching method of the embodiment, since it is possible to accurately judge the timing of taking out the connection pin just by checking the rotation of the connection pin, various materials of the preform and the members such as the connection pin and the support body are not damaged. Then, since it is possible to omit an unnecessary operation of moving the preform or the support body upward or downward, it is possible to simply and efficiently attach or detach the preform. Further, since a large connection pin may be easily used as well as the operation of the connection pin being simple, a large preform may be also easily handled.

<Method of Manufacturing Optical Fiber>

A method of manufacturing an optical fiber of the embodiment includes the step of attaching and detaching the preform to and from the support body by the method of the embodiment above.

Examples of the step including the above-described attaching and detaching step include a step of manufacturing a silica porous preform by depositing silica glass particles on a target, a step of manufacturing an optical fiber preform by performing sintering or dehydrating and sintering on the silica porous preform, a step of processing a front end of the optical fiber preform, and a step of manufacturing an optical fiber by drawing the optical fiber preform. In one of these steps, the above-described attaching and detaching step may be performed.

The method of manufacturing the optical fiber of the embodiment is the same as that of the known manufacturing method except that the above-described attaching and detaching step is provided. Then, since it is possible to simply and efficiently attach or detach the preform, the optical fiber is manufactured highly efficiently. Further, since a high-quality preform is used, it is possible to manufacture an optical fiber having excellent optical characteristics.

EXAMPLES

Hereinafter, the present invention will be described in more detail by referring to specific examples. However, the present invention is not limited to the examples described below.

Example 1

A dummy member was connected to both ends of a preform body having a diameter of 40 mm and a length of 1400 mm manufactured by vapor-phase axial deposition method, and a silica porous preform having a diameter of 230 mm and a mass of about 45 kg was manufactured by outside vapor-phase deposition method.

In the dummy member, a member connected to a support body was set as the upper end portion of the preform.

Subsequently, in the silica porous preform, the upper dummy member and the rod-shaped support body were connected to each other through a connection component using the connection pin as shown in FIG. 8. Then, the silica porous preform was slightly moved downward to be hung on the connection pin, and the silica porous preform was attached to the support body. The connection pin used at this time was the connection pin shown in FIG. 1. The length $L_{a1}$ of the long shaft portion 11a was 12.0 cm. The length $L_{b1}$ of the short shaft portion 11b was 3.0 cm. The outer diameter $d_{a1}$ of the long shaft portion and the outer diameter $d_{b1}$ of the short shaft portion were both 1.7 cm. The angle $\psi_1$ formed between the long shaft portion and the short shaft portion was 90°. Further, the surface of the connection pin was subjected to flame-polishing. The surface roughness (Ra) of the connection pin was 0.18 μm. Then, the angle θ formed between the length direction of the short shaft portion of the connection pin and the vertical direction was 90°. In this condition, the moment M acting on the connection pin was $2.2 \times 10^{-1}$ (N·cm) according to the equation (1).

By performing dehydrating and sintering on the silica porous preform attached as described above using a sintering furnace, a transparent optical fiber preform was manufactured.

Subsequently, the lower portion of the optical fiber preform was gripped by a gripper device. In this state, the optical fiber preform was moved upward by about 3 mm, so that the connection pin was rotated about the central axis of the long shaft portion, and the short shaft portion faced downward (the state having an angle θ of 0°). Accordingly, it was checked that the state in which the optical fiber preform was hung on the connection pin was released. Then, the optical fiber preform was stopped, and the connection pin was taken out, so that the optical fiber preform was detached from the connection component.

The above-described operation was performed 20 times in total, and in each operation, the shapes of the penetration hole (the first penetration hole) of the detached dummy member, the penetration hole (the second penetration hole) of the connection component, and the connection pin were observed by viewing. The result is shown in Table 1.

As shown in Table 1, in all operations performed 20 times, no defect or damage was found to both penetration holes of the dummy member and the connection component and the connection pin, and the members were maintained in a satisfactory state. Further, since the operation was simply and promptly performed, the working efficiency was high.

Examples 2 to 9

The transparent optical fiber preform was manufactured in the same manner as the example 1 except that the angle θ was set as shown in Tables 1 and 2, and the shapes of the penetration hole of the dummy member detached from the connection component and the penetration hole of the connection component were observed by viewing. The result is shown in Tables 1 and 2.

As shown in Tables 1 and 2, in the case of any connection pin, in all operations performed 20 times, no defect or damage was found to both penetration holes of the dummy member and the connection component and the connection pin, and the members were maintained in a satisfactory state. Further, since the operation was simply and promptly performed, the working efficiency was high.

Comparative Examples 1 to 5

The transparent optical fiber preform was manufactured in the same manner as the example 1 except that the angle θ was set as shown in Table 3, and the shapes of the penetration hole of the dummy member detached from the connection component and the penetration hole of the connection component were observed by viewing. The result is shown in Table 3.

In the comparative example 1, no particular abnormality was found during the operations performed 17 times among the operations performed 20 times. However, since the connection pin was not smoothly rotated at the three times of operations, it was not possible to check whether the state in which the optical fiber preform was hung on the connection pin was released. For this reason, the connection pin was not able to be taken out at one time, and the optical fiber preform was repetitively moved upward while attempting to take out the connection pin. Then, the connection pin was taken out, and the optical fiber preform was barely detached from the connection component. Likewise, since the work was complicated, a long time was taken and the working efficiency was low. Then, the dummy member, the connection component, and the connection pin were observed. At the three times of operations, scratching was generated in the surface of the connection pin, and a defect generated in the penetration hole of the dummy member.

On the contrary, in the example 10 (Ra: 0.4 μm) in which the surface roughness (Ra) was substantially equal to that of the comparative example 1, the connection pin was able to be taken out at one time, and the dummy member, the connection component, and the connection pin were all maintained in a satisfactory state. Then, since the comparative examples 1 and the example 10 have different moments M, it is thought that the reason why the above-described problem was generated in the comparative example 1 was because the moment M is small.

In the comparative example 2, no particular abnormality was found during the operations performed 19 times among the operations performed 20 times. However, since the connection pin was not smoothly rotated at the once operation, it was not possible to check whether the state in which the optical fiber preform was hung on the connection pin was released. For this reason, as in the comparative example 1, the connection pin was not able to be taken out at one time, and the optical fiber preform was repetitively moved upward while attempting to take out the connection pin. Then, the connection pin was taken out, and the optical fiber preform was barely detached from the connection component. Likewise, since the work was complicated, a long time was taken and the working efficiency was low. Then, the dummy member, the connection component, and the connection pin were observed, and it was found that scratching was generated in the surface of the connection pin.

On the contrary, in the example 3 (Ra: 0.9 μm) in which the surface roughness (Ra) was substantially equal to that of the comparative example 2, as described above, the connection pin was able to be taken out at one time, and the dummy member, the connection component, and the connection pin were all maintained in a satisfactory state. Then, since the comparative examples 2 and the example 3 have different moments M, it is thought that the reason why the above-described problem was generated in the comparative example 2 was because the moment M was small.

In the comparative example 3, no particular abnormality was found during the operations performed 18 times among the operations performed 20 times. However, since the connection pin was not smoothly rotated at the once operation, it was not possible to check whether the state in which the optical fiber preform was hung on the connection pin was released. For this reason, as in the comparative example 1, the connection pin was not able to be taken out at one time, and the optical fiber preform was repetitively moved upward while attempting to take out the connection pin. Then, the connection pin was taken out, and the optical fiber preform was barely detached from the connection component. Likewise, since the work was complicated, a long time was taken and the working efficiency was low. Then, the dummy member, the connection component, and the connection pin were observed, and it was found that scratching was generated in the surface of the connection pin. Also, glass powders not observed at the first time were mixed with the inside of the penetration hole of the dummy member, so that it reached a state in which the connection pin was easily caught by the penetration hole. On the other hand, at the other once operation, the connection pin was bent when detaching the manufactured optical fiber preform, so that the optical fiber preform was dropped to the sintering furnace.

On the contrary, in the example 5 (Ra: 0.3 μm) in which the surface roughness (Ra) was substantially equal to that of the comparative example 3, as described above, the connection pin was able to be taken out at one time, and the dummy member, the connection component, and the connection pin were all maintained in a satisfactory state. Then, since the comparative examples 3 and the example 5 have different moments M, it is thought that the reason why the above-described problem was generated in the comparative example 3 was because the moment M was small.

In the comparative example 4, no particular abnormality was found during the operations performed 19 times among the operations performed 20 times. However, since the connection pin was not smoothly rotated at the once operation, it was not possible to check whether the state in which the optical fiber preform was hung on the connection pin was released. For this reason, as in the comparative example 1, the connection pin was not able to be taken out at one time, and the optical fiber preform was repetitively moved upward while attempting to take out the connection pin. Then, the connection pin was taken out, and the optical fiber preform was barely detached from the connection component. Likewise, since the work was complicated, a long time was taken and the working efficiency was low. Then, the dummy member, the connection component, and the connection pin were observed, and it was found that scratching was generated in the surface of the connection pin. Also, glass powders not observed at the first time were mixed with the inside of the penetration hole of the dummy member, so that it reached a state in which the connection pin was easily caught by the penetration hole.

On the contrary, in the example 6 (Ra: 1.5 μm) having the same surface roughness (Ra) as that of the comparative example 4 and the example 4 (Ra: 4.2 μm) having the surface roughness 2.5 times that of the comparative example 4, as described above, the connection pin was able to be taken out at one time, and the dummy member, the connection component, and the connection pin were all maintained in a satisfactory state. Then, since the comparative example 4 and the examples 4 and 6 have different moments M, it is thought that the reason why the above-described problem was generated in the comparative example 4 was because the moment M was small.

In the comparative example 5, the connection pin was not rotated, and it was not possible to check whether the state in which the optical fiber preform was hung on the connection pin was released. For this reason, it was attempted to take out the connection pin by trial and error. As a result, no particular abnormality was found in the operations performed 18 times among the operations performed 20 times. However, at the twice operations, the optical fiber preform was repetitively moved upward and downward while attempting to take out the connection pin several times. Then, the connection pin was taken out, and the optical fiber preform was barely detached from the connection component. As a result, the dummy member, the connection component, and the connection pin were observed, and it was found that scratching was generated in the surface of the connection pin and the inside of the penetration hole. Likewise, although the value of the surface roughness (Ra) was sufficiently small, the above-described problem was generated. Further, since the work was complicated, a long time was taken and the working efficiency was low.

TABLE 1

| | | EXAMPLE 1 | EXAMPLE 2 | EXAMPLE 3 | EXAMPLE 4 | EXAMPLE 5 |
|---|---|---|---|---|---|---|
| CONNECTION PIN | LENGTH $L_{a1}$ (cm) OF LONG SHAFT PORTION | 12.0 | 12.0 | 12.0 | 12.0 | 12.0 |
| | LENGTH $L_{b1}$ (cm) OF SHORT SHAFT PORTION | 3.0 | 10.0 | 3.0 | 3.0 | 1.0 |
| | OUTER DIAMETERS $d_{a1}$, $d_{b1}$ (cm) | 1.7 | 1.7 | 1.3 | 1.3 | 1.3 |
| | SURFACE ROUGHNESS Ra (μm) | 0.18 [FLAME- | 2.2 [GRINDING | 0.9 [GRINDING | 4.2 [OPAQUE | 0.3 [GRINDING |

TABLE 1-continued

|  |  | EXAMPLE 1 | EXAMPLE 2 | EXAMPLE 3 | EXAMPLE 4 | EXAMPLE 5 |
|---|---|---|---|---|---|---|
|  | [SURFACE STATE] | POLISHING FINISHING) | FINISHING] | FINISHING] | SILICA] | FINISHING] |
|  | ANGLE θ (°) | 90 | 90 | 5 | 5 | 160 |
|  | MOMENT M (N · cm) | $2.2 \times 10^{-1}$ | $2.4 \times 10^{0}$ | $1.1 \times 10^{-2}$ | $1.1 \times 10^{-2}$ | $4.9 \times 10^{-3}$ |
| RESULT | NUMBER OF TIMES OF ABNORMAL ROTATION OF CONNECTION PIN (NUMBER/20 TIMES) | 0 | 0 | 0 | 0 | 0 |
|  | NUMBER OF TIMES OF ABNORMALITY OF PENETRATION HOLE (NUMBER/20 TIMES) | 0 | 0 | 0 | 0 | 0 |

TABLE 2

|  |  | EXAMPLE 6 | EXAMPLE 7 | EXAMPLE 8 | EXAMPLE 9 |
|---|---|---|---|---|---|
| CONNECTION PIN | LENGTH $L_{a1}$ (cm) OF LONG SHAFT PORTION | 12.0 | 12.0 | 12.0 | 12.0 |
|  | LENGTH $L_{b1}$ (cm) OF SHORT SHAFT PORTION | 3.0 | 5.0 | 5.0 | 1.0 |
|  | OUTER DIAMETERS $d_{a1}$, $d_{b1}$ (cm) | 1.3 | 1.7 | 1.3 | 1.3 |
|  | SURFACE ROUGHNESS Ra (μm) | 1.5 | 0.12 | 0.2 | 0.15 |
|  | [SURFACE STATE] | [GRINDING FINISHING] | [FLAME-POLISHING FINISHING] | [FLAME-POLISHING FINISHING] | [FLAME-POLISHING FINISHING] |
|  | ANGLE θ (°) | 90 | 90 | 90 | 10 |
|  | MOMENT M (N · cm) | $1.3 \times 10^{-1}$ | $6.1 \times 10^{-1}$ | $3.6 \times 10^{-1}$ | $2.5 \times 10^{-3}$ |
| RESULT | NUMBER OF TIMES OF ABNORMAL ROTATION OF CONNECTION PIN (NUMBER/20 TIMES) | 0 | 0 | 0 | 0 |
|  | NUMBER OF TIMES OF ABNORMALITY OF PENETRATION HOLE (NUMBER/20 TIMES) | 0 | 0 | 0 | 0 |

TABLE 3

|  |  | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|
| CONNECTION PIN | LENGTH $L_{a1}$ (cm) OF LONG SHAFT PORTION | 12.0 | 12.0 | 12.0 | 12.0 | 12.0 |
|  | LENGTH $L_{b1}$ (cm) OF SHORT SHAFT PORTION | 1.0 | 1.0 | 1.0 | 1.0 | 1.0 |
|  | OUTER DIAMETERS $d_{a1}$, $d_{b1}$ (cm) | 1.3 | 1.3 | 1.3 | 1.3 | 1.3 |
|  | SURFACE ROUGHNESS Ra (μm) | 0.5 | 1.0 | 0.35 | 1.5 | 0.15 |
|  | [SURFACE STATE] | [GRINDING FINISHING] | [GRINDING FINISHING] | [GRINDING FINISHING] | [GRINDING FINISHING] | [GRINDING FINISHING] |
|  | ANGLE θ (°) | 160 | 15 | 10 | 160 | 0 |
|  | MOMENT M (N · cm) | $4.9 \times 10^{-3}$ | $3.7 \times 10^{-3}$ | $2.5 \times 10^{-3}$ | $4.9 \times 10^{-3}$ | 0 |
| RESULT | NUMBER OF TIMES OF ABNORMAL ROTATION OF CONNECTION PIN (NUMBER/20 TIMES) | 3 | 1 | 2 | 1 | 2 |
|  | NUMBER OF TIMES OF ABNORMALITY OF PENETRATION HOLE (NUMBER/20 TIMES) | 3 | 0 | 1 | 1 | 2 |

Example 10

A connection pin was the connection pin shown in FIGS. 5A and 5B. The length $L_{a2}$ was 12 cm, the length $L_{b21}$ was 3.0 cm, and the length $L_{b22}$ was 4.0 cm. The outer diameter $d_{a1}$ of the long shaft portion 12a, the outer diameter $d_{b21}$ of the first short shaft portion 12b$_1$, and the outer diameter $d_{b22}$ of the second short shaft portion 12b$_2$ were all 1.7 cm. The angle $\psi_{21}$ formed between the long shaft portion and the first short shaft portion and the angle $\psi_{22}$ formed between the long shaft portion and the second short shaft portion were both 90°. The connection pin was used in which the angle $\psi_{20}$ formed between the first short shaft portion and the second short shaft portion was 180°, and the transparent optical fiber preform was manufactured in the same manner as the example 1 except that the insertion angle θ was set as shown in Table 4. In this condition, the moment M acting on the connection pin was $1.9 \times 10^{-2}$ (N·cm) according to the equation (5). Then, the shapes of the penetration hole (the first penetration hole) of the detached dummy member, the penetration hole (the second penetration hole) of the connection component, and the connection pin were observed by viewing. The result is shown in Table 4.

When the optical fiber preform was manufactured, it was possible to check whether the state in which the optical fiber preform was hung on the connection pin was released, and to take out the connection pin at one time. As a result, as shown in Table 4, in all operations performed 20 times, no defect or damage was found in both penetration holes of the dummy member and the connection component and the connection pin, and the members were maintained in a satisfactory state. Further, since the operation was simply and promptly performed, the working efficiency was high.

TABLE 4

|  |  | EXAMPLE 10 |
|---|---|---|
| CONNECTION PIN | LENGTH $L_{a2}$ (cm) OF LONG SHAFT PORTION | 12.0 |
|  | LENGTH $L_{b21}$ (cm) OF FIRST SHORT SHAFT PORTION | 3.0 |
|  | LENGTH $L_{b22}$ (cm) OF SECOND SHORT SHAFT PORTION | 4.0 |
|  | OUTER DIAMETERS $d_{a2}, d_{b21}, d_{b22}$ (cm) | 1.7 |
|  | SURFACE ROUGHNESS Ra (μm) [SURFACE STATE] | 0.4 [GRINDING FINISHING] |
|  | ANGLE θ (°) | 5 |
|  | MOMENT M (N · cm) | $1.9 \times 10^{-2}$ |
| RESULT | NUMBER OF TIMES OF ABNORMAL ROTATION OF CONNECTION PIN (NUMBER/20 TIMES) | 0 |
|  | NUMBER OF TIMES OF ABNORMALITY OF PENETRATION HOLE (NUMBER/20 TIMES) | 0 |

Figure 9:
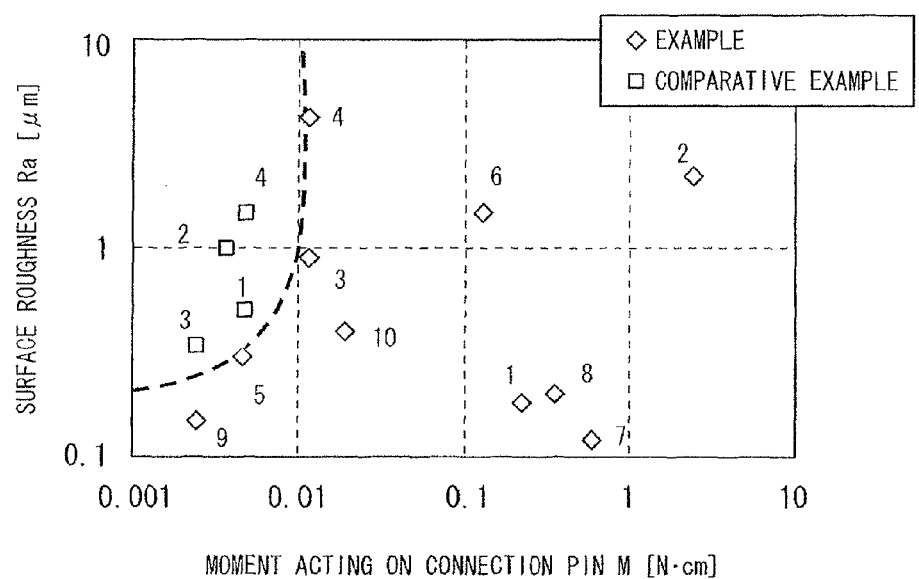
FIG. 9 is a diagram illustrating a relationship between a moment acting on the connection pin and surface roughness of the connection pin of examples 1 to 10 and comparative examples 1 to 4, and is a graph in which the measurement values are plotted.

As a diagram illustrating a relationship between the moment acting on the connection pin and the surface roughness of the connection pin in the examples 1 to 10 and the comparative examples 1 to 4, a graph having a plotted measurement value is shown in FIG. 9. The number given to the plot area of FIG. 9 indicates the number of the example and the comparative example.

As obviously understood from FIG. 9, in the connection pin (the examples 1 and 7 to 9) of which the surface was subjected to flame-polishing, the surface roughness (Ra) was less than 0.2 μm. In the connection pin (the examples 2, 3, 5, 6, and 10) of which the surface was subjected to grinding finishing, the surface roughness was less than 2.2 μm. In all examples, satisfactory results were obtained. Further, in the connection pin (the example 4) in which the connection pin was formed of opaque silica, the surface roughness was high such as to be 4.2 μm. However, since the moment was large, a satisfactory result was obtained.

Further, as understood from FIG. 9, it was proved that the moment acting on the connection pin must be greater than or equal to $1.0 \times 10^{-2}$ (N·cm) in order to obtain the effect of the present invention regardless of the surface roughness of the connection pin. Furthermore, it was proved that the surface roughness must be less than or equal to 0.3 μm in order to obtain the effect of the invention when the moment was less than $1.0 \times 10^{-2}$ (N·cm).

REFERENCE EXAMPLE 1

In order to investigate the influence of the moment based on the friction between the insertion portion of the connection pin and the penetration hole, the following test was performed.

Figure 10:
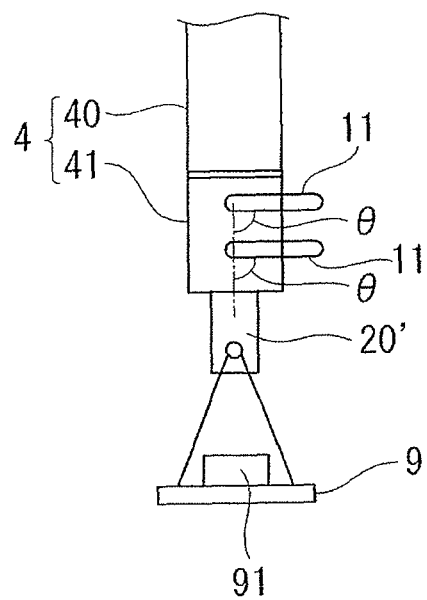
FIG. 10 is a front view illustrating the attaching and detaching method of reference examples 1 and 2.

As shown in FIG. 10, the dummy member 20' and the rod-shaped support body 4 were connected to each other through the connection component 41 by using the connection pin 11, so that the dummy member 20' was hung on the support body. The connection pin 11 used at this time was the same as that of the example 1 except that the outer diameter $d_{a1}$ of the long shaft portion was 3.5 cm, and was larger than the outer diameter $d_{b1}$ (1.7 cm) of the short shaft portion. Then, a load plate 9 was further suspended on the dummy member 20', and a weight 91 of 40 kg was placed on the load plate 9. The angle θ formed between the length direction of the short shaft portion of the connection pin 11 and the vertical direction was 90°. In this condition, the sum ($M=M_b + M_a$(N·cm)) of the moment acting on the connection pin 11 was $1.8 \times 10^{-1}$ (N·cm).

Subsequently, the dummy member 20' was moved upward by a lifter (not shown) by 3 mm together with the load plate 9, so that the connection pin 11 used to hang the dummy member 20' thereon was rotated about the central axis of the long shaft portion, and the short shaft portion faced downward (the state of the angle θ of 0°). Accordingly, it was possible to check that the state in which the dummy member 20' and the load plate 9 were hung on the connection pin 11 was released. Therefore, the lifter was stopped, and the connection pin 11 was taken out, so that the dummy member was detached from the connection component.

The above-described operation was performed 20 times in total, and in each operation, the shapes of the penetration hole (the first penetration hole) of the detached dummy member 11, the penetration hole (the second penetration hole) of the connection component, and the connection pin were observed by viewing. The result is shown in Table 5.

As shown in Table 5, in all operations performed 20 times, no defect or damage was found to both penetration holes of the dummy member and the connection component and the connection pin, and the members were maintained in a satisfactory state. Further, since the operation was simply and promptly performed, the working efficiency was high.

The result obtained herein supports the idea that the influence of the insertion portion may be generally disregarded and the idea that the effect of the present invention is obtained regardless of the surface roughness of the connection pin when the moment acting on the connection pin is set to be greater than or equal to $1.0 \times 10^{-2}$ (N·cm).

REFERENCE EXAMPLE 2

A connection pin used herein was the same as the connection pin of the example 6 except that the outer diameter $d_{a1}$ of the long shaft portion of the connection pin was 4.1 cm, and was larger than the outer diameter $d_{b1}$ (1.3 cm) of the short shaft portion. Except for using the connection pin, as in the reference example 1, the dummy member was moved upward together with the load plate after the dummy member and the load plate were hung on the connection pin. Further, the sum ($M=M_b+M_a$(N·cm)) of the moment acting on the connection pin 11 was $2.0 \times 10^{-2}$ (N·cm).

The above-described operation was performed 20 times in total, and in each operation, the shapes of the penetration hole (the first penetration hole) of the detached dummy member, the penetration hole (the second penetration hole) of the connection component, and the connection pin were observed by viewing. The result is shown in Table 5.

As shown in Table 5, in all operations performed 20 times, no defect or damage was found to both penetration holes of the dummy member and the connection component and the connection pin, and the members were maintained in the satisfactory state. Further, since the operation was simply and promptly performed, the working efficiency was high.

As in the case of the reference example 1, the result obtained herein supports the idea that the influence of the insertion portion may be generally disregarded and the idea that the effect of the present invention is obtained regardless of the surface roughness of the connection pin when the moment acting on the connection pin is set to be greater than or equal to $1.0 \times 10^{-2}$ (N·cm).

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A method of attaching and detaching a preform to and from a support body, the preform being used to manufacture an optical fiber, the method comprising:
    inserting a connection pin through a penetration hole provided in the preform and a penetration hole provided in the support body;
    attaching the preform to the support body by hanging the preform on the connection pin inserted through the penetration holes; and
    detaching the preform from the support body by taking out the connection pin from the penetration holes after the connection pin is rotated about an insertion axis due to an action of a moment based on gravity when the hung state of the preform hung on the connection pin is released.

2. The method according to claim 1, wherein:
    at least one of the preform and the support body is movable in a vertical direction;
    a vertical position of the preform relative to the support body is adjustable;
    when the connection pin is inserted through the penetration holes, the preform is moved upward relative to the support body so that a position of the penetration hole pro-

TABLE 5

|  |  | REFERENCE EXAMPLE 1 | REFERENCE EXAMPLE 2 |
|---|---|---|---|
| CONNECTION PIN | LENGTH $L_{a1}$ (cm) OF LONG SHAFT PORTION | 12.0 | 12.0 |
|  | LENGTH $L_{b1}$ (cm) OF SHORT SHAFT PORTION | 3.0 | 3.0 |
|  | OUTER DIAMETER $d_{a1}$ (cm) OF LONG SHAFT PORTION | 3.5 | 4.1 |
|  | OUTER DIAMETER $d_{b1}$ (cm) OF SHORT SHAFT PORTION | 1.7 | 1.3 |
|  | SURFACE ROUGHNESS Ra (μm) [SURFACE STATE] | 0.18 [FLAME POLISHING-FINISHING] | 1.5 [GRINDING FINISHING] |
|  | ANGLE θ (°) | 90 | 90 |
|  | MOMENT $M_b$ (N·cm) | $2.2 \times 10^{-1}$ | $1.3 \times 10^{-1}$ |
|  | MOMENT $M_a$ (N·cm) | $-4.0 \times 10^{-2}$ | $-1.1 \times 10^{-1}$ |
|  | MOMENT M (N·cm) | $1.8 \times 10^{-1}$ | $2.0 \times 10^{-2}$ |
| RESULT | NUMBER OF TIMES OF ABNORMAL ROTATION OF CONNECTION PIN (NUMBER/20 TIMES) | 0 | 0 |
|  | NUMBER OF TIMES OF ABNORMALITY OF PENETRATION HOLE (NUMBER/20 TIMES) | 0 | 0 | vided in the preform is aligned with a position of the penetration hole provided in the support body, and the connection pin is inserted through the penetration holes;

when the preform is attached to the support body, the preform is moved downward relative to the support body so that the preform is hung on the connection pin; and when the preform is detached from the support body, the preform is moved upward relative to the connection pin so that the hung state of the preform is released.

3. The method according to claim 1, wherein:

the connection pin includes an insertion portion which is inserted through the penetration hole of the preform and the penetration hole of the support body, and a non-insertion portion which forms a predetermined angle with respect to the insertion portion; and when the preform is attached to the support body, the connection pin is disposed in the penetration holes so that an angle formed between a central axis of the non-insertion portion and a direction of gravity is neither 0° nor 180°.

4. The method according to claim 1, wherein the moment is greater than or equal to $1\times10^{-2}$ (N·cm).

5. The method according to claim 1, wherein the connection pin is formed of silica glass.

6. The method according to claim 1, wherein the connection pin is colorless and transparent or a part of the connection pin is white.

7. The method according to claim 1, wherein:

the support body includes a connection component that is attachable to the support body or detachable from the support body; and the connection component is connected to the preform.

8. A method of manufacturing an optical fiber, the method comprising:

attaching and detaching a preform to and from a support body through the attaching and detaching method according to claim 1.

9. The method according to claim 8, wherein the attaching and detaching is included in one or more steps selected from a group including manufacturing a silica porous preform by depositing silica glass particles on a target, manufacturing an optical fiber preform by performing sintering or dehydrating and sintering on the silica porous preform, sharpening a front end of the optical fiber preform, and manufacturing an optical fiber by drawing the optical fiber preform.

* * * * *